Jan. 28, 1930.  C. T. WEYMANN  1,744,849
MOTOR VEHICLE BODY
Original Filed March 27, 1925  2 Sheets-Sheet 1

Inventor:
Charles Terres Weymann,
By Rector, Hibben, Davis & Macauley
Attorneys

Jan. 28, 1930. C. T. WEYMANN 1,744,849
MOTOR VEHICLE BODY
Original Filed March 27, 1925  2 Sheets-Sheet 2
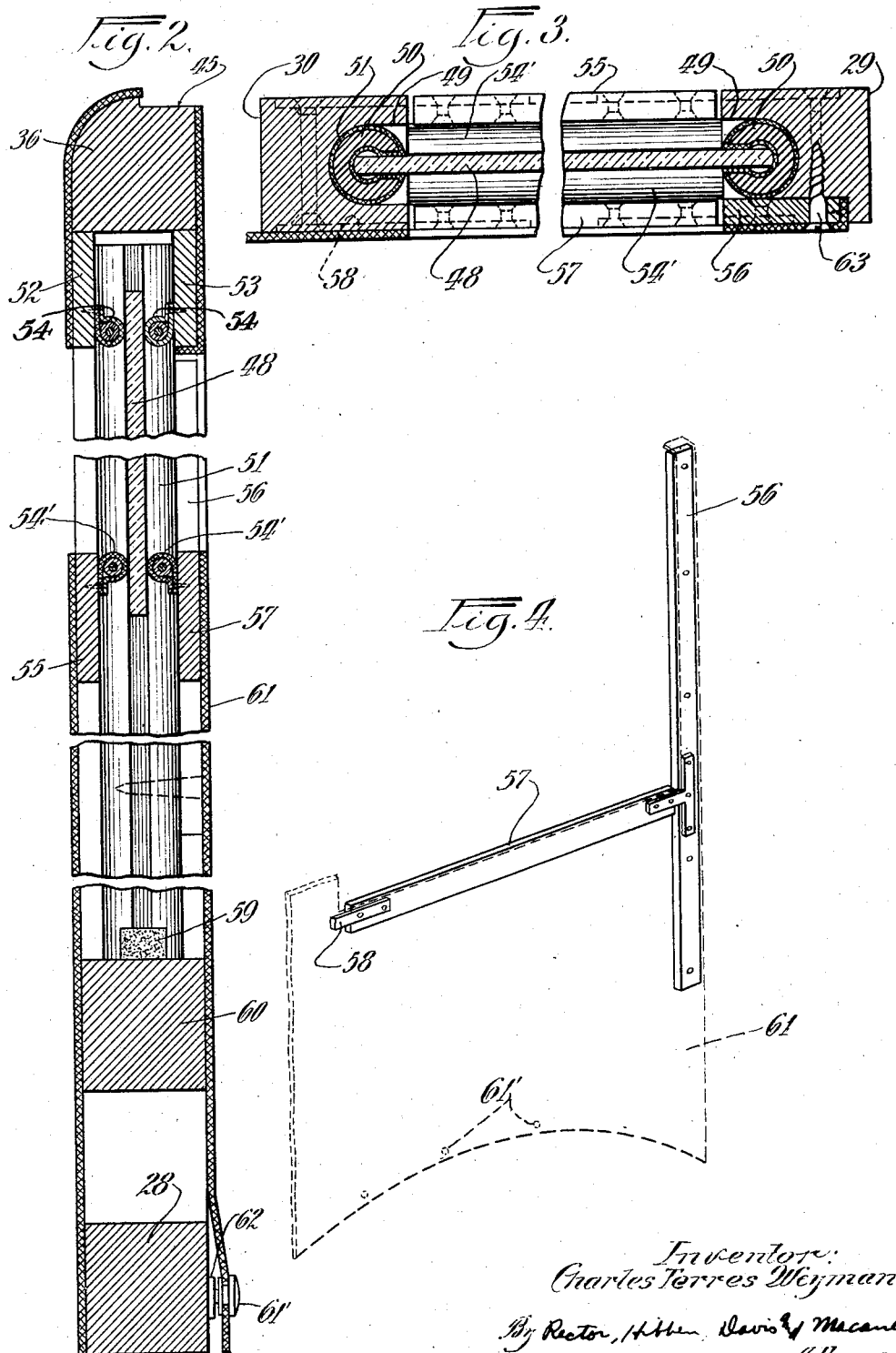

Patented Jan. 28, 1930

1,744,849

UNITED STATES PATENT OFFICE

CHARLES TERRES WEYMANN, OF PARIS, FRANCE, ASSIGNOR, BY MESNE ASSIGNMENTS, TO WEYMANN MOTOR BODIES, INC., OF WILMINGTON, DELAWARE, A CORPORATION OF DELAWARE

MOTOR-VEHICLE BODY

Original application filed March 27, 1925, Serial No. 18,714. Divided and this application filed December 20, 1927. Serial No. 241,419.

My invention relates to motor vehicle bodies and more particularly to the formation of wells for the windows.

This application is a division of my application Serial No. 18,714 filed March 27, 1925, for closed road-motor-vehicle body.

The principal object of my invention is to form a flexible panel covered with lining or inside finishing fabric so that a window may be inserted in and removed from the window well easily and quickly.

With this object in view, the invention consists of novel features of construction and combinations of parts, the essential elements of which are recited in the appended claims and the preferred form of embodiment of which is described in detail hereinafter and illustrated in full in the accompanying drawings which form part of this specification.

Of said drawing, Figure 1 is an inside elevation of the rear parts of one side of the body skeleton frame, showing the top bows in cross-section.

Fig. 2 is a vertical section taken through one of the rear side windows and the side of the finished body, as on the line 2—2 of Fig. 1.

Fig. 3 is a horizontal section taken on the line 3—3 of Fig. 1, and

Fig. 4 is a perspective view of the T-shaped frame permitting a window to be easily inserted in and removed from its well, the finishing lining being shown in dotted lines for the sake of clearness.

Figure 1:
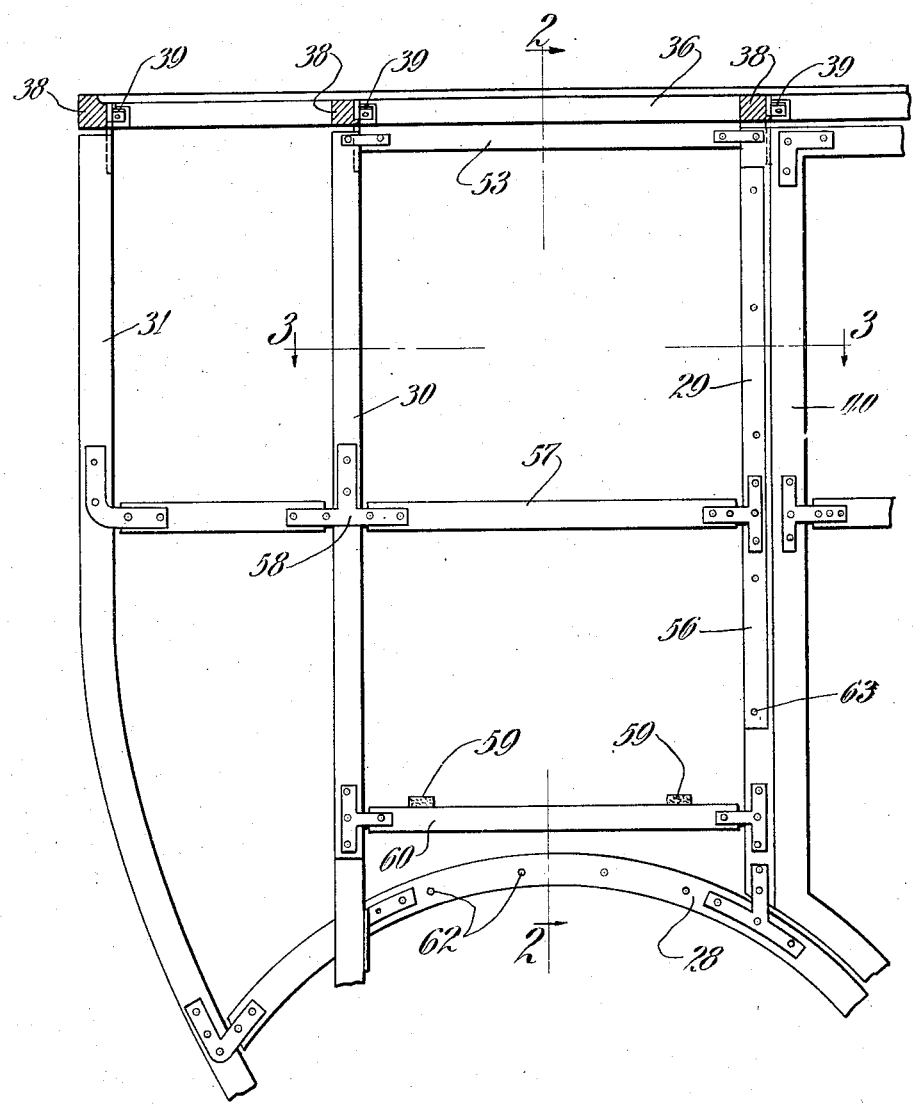

I have illustrated in these drawings, a form of my invention as applied to the well-known Weymann type of body, which is adapted to weave or flex with the chassis-frame as fully exemplified by my U. S. Patent No. 1,519,093, but it will be understood that my invention is not limited to use on that type of body. The Weymann body is formed of a light skeleton frame covered by a flexible covering such as leather, imitation leather or the like. The skeleton frame consists of relatively light pieces connected together by flexible joints.

Referring to Fig. 1, which shows the inner side of the left-hand rear side portion of one of these Weymann skeleton frames, top cross bows 38, which are shown in section, are connected to their respective vertical posts 29, 30 and 31 and to intermediate longitudinal top pieces 36 by means of Weymann joints 39. The lower ends of these vertical posts are connected by Weymann joints to a curved piece 28. Only a portion of the skeleton frame 40 for the rear left-hand door is shown.

Referring now to Figs. 2 and 3, a window or pane of glass 48, may be mounted between the vertical posts 29 and 30 on each side of the body. These posts are provided with facing grooves 49 (Fig. 3) in which are mounted window guides 50 formed of fabric-covered rubber tubing which is slit longitudinally so that the edges of the glass fit in the tubes. Near the top of the posts 29 and 30 and connected thereto are parallel strips 52 and 53 forming a pocket into which the upper edge of the glass is adapted to extend when the window is closed, suitable weather-excluding beadings 54 being secured to the sides of the pieces 52 and 53, as best shown in Fig. 2. The vertical posts 29 and 30 are also connected by a horizontal piece 55 which forms the outer lower edge of the window opening. The inner side of the vertical post 29 is grooved or mitered to accommodate a vertical piece 56 which is connected intermediate its ends to a horizontal strip 57 connected at its rear end to the post 30 by a joint 58. As will be noted in Fig. 2, the window slides between the pieces 55 and 57, these pieces likewise being provided with beadings 54'. When the window is fully lowered it is adapted to rest on rubber or elastic blocks 59 supported on a cross-piece 60.

The inner finishing lining 61 may be tacked to the vertical post 30 and also to the vertical piece 56. The lower edge of the lining 61 is provided with snap buttons 61' adapted to snap over pins 62 on the curved piece 28 of the skeleton frame. The vertical piece 56 may be secured to the vertical post 29 by screws 63 or other suitable devices.

In case it is desired to remove or replace the window or obtain access to the window lifting mechanism, which is not shown, it will be evident that it is only necessary to remove the screws 63, unfasten the snap buttons 62 and swing the bar 56 inwardly, the joint 58 being flexible to permit this movement. Thus access may be readily had to the window well when desired.

I claim:

1. In a road motor vehicle body, the combination of two vertical posts, a window slidable between said posts, an inside panel comprising a frame and a lining secured thereto and forming the inner wall of the window well, means concealed by the lining for connecting one end of the frame to one of the posts to permit the frame to be swung open, means for securing the other end of the frame to the other post, and quick detachable means for fastening a free edge of the lining when the frame is closed.

2. In a road motor vehicle body, the combination of two vertical posts, a window slidable between said posts, an inside panel comprising a frame and a lining secured thereto, and forming the inner wall of the window well, a flexible metal strip for connecting one end of the frame to one of the posts to permit the frame to be swung open, means concealed by the lining for securing the other end of the frame to the other post, and quick detachable means for fastening a free edge of the lining when the frame is closed.

3. In a road motor vehicle body, the combination of two vertical posts one of which is provided with a groove in its inside face, a window slidable between said posts, an inside panel comprising a vertical piece, a horizontal piece and a piece of lining secured at one edge to the vertical piece, means secured to one end of the horizontal piece to permit the panel to be swung open, means for securing said vertical piece in said groove, a horizontal bar under the window well, and snap means for securing the lower edge of the piece of lining to said horizontal bar.

CHARLES TERRES WEYMANN.